May 30, 1972     E. C. BRIGGS ET AL     3,666,396
COMBUSTION APPARATUS

Filed March 29, 1971     5 Sheets-Sheet 1

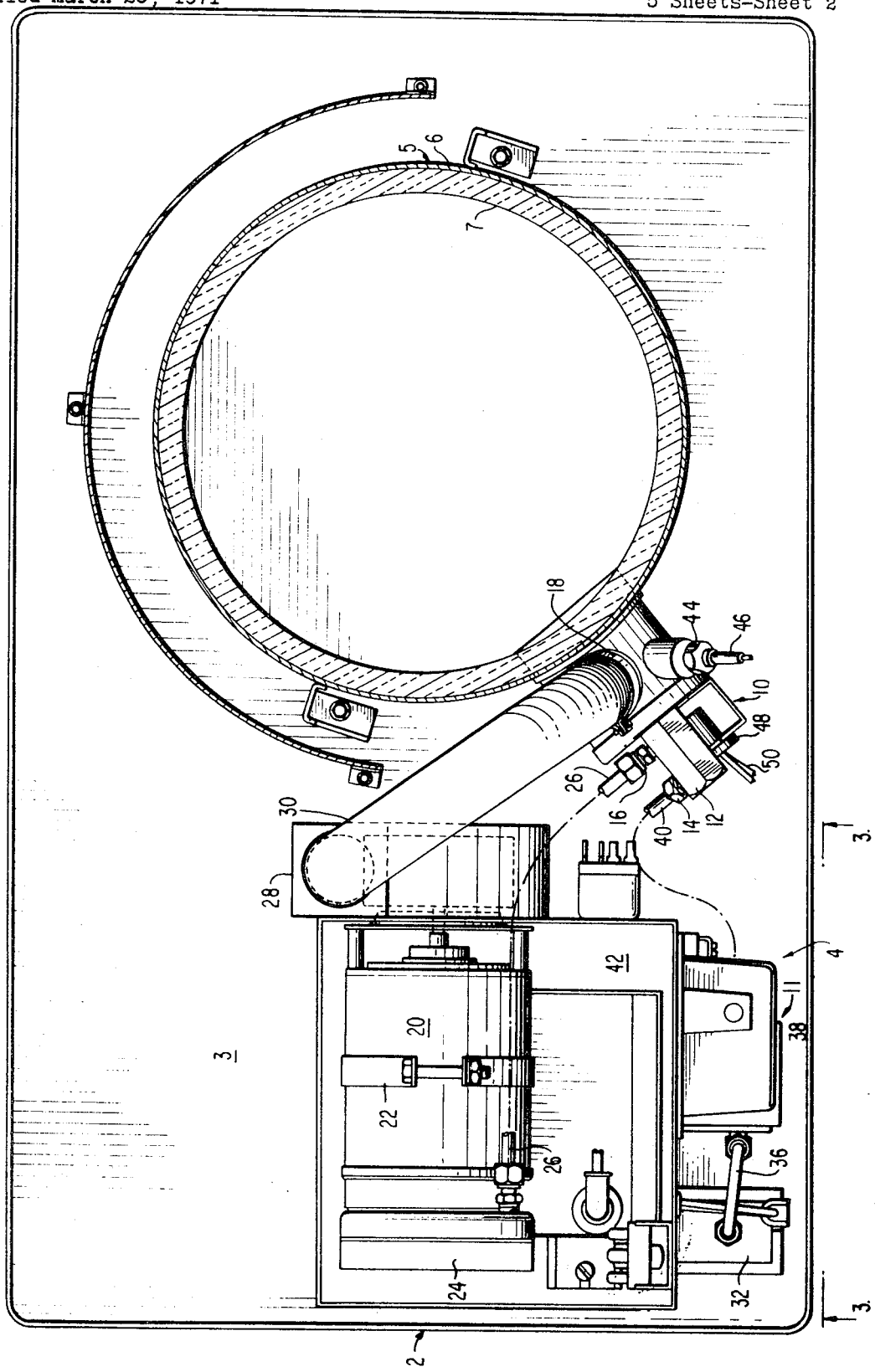

May 30, 1972   E. C. BRIGGS ET AL   3,666,396
COMBUSTION APPARATUS
Filed March 29, 1971   5 Sheets-Sheet 3

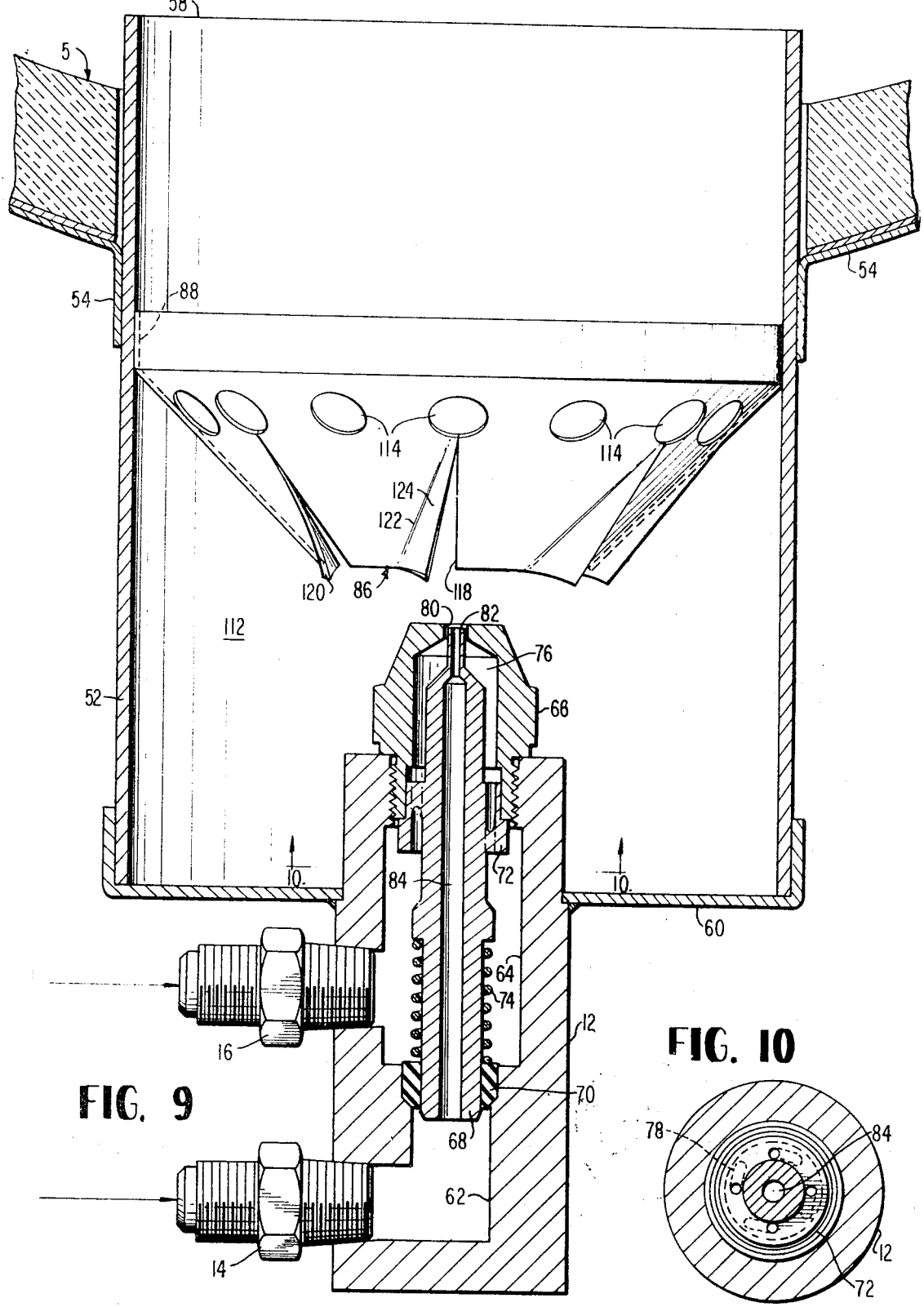

United States Patent Office 3,666,396
Patented May 30, 1972

3,666,396
COMBUSTION APPARATUS
Eugene C. Briggs and William C. Wellbaum, Dayton, Ohio, assignors to Koehring Company, Milwaukee, Wis.
Filed Mar. 29, 1971, Ser. No. 128,726
Int. Cl. F23q 3/00
U.S. Cl. 431—264
10 Claims

ABSTRACT OF THE DISCLOSURE

The generator of a compact absorption cycle chiller is heated by oil fired combustion apparatus made up of a burner assembly mounted on the heat receiver for the generator and a fluid supply and control assembly separately mounted within the chiller housing. Both assemblies are accessible for servicing from one side of the housing and they are connected by fluid conduits and electrical cables. The burner assembly includes an aspirator nozzle projecting into the outer end of the burner tube, an auxiliary air inlet into an upper side of the burner tube near the nozzle tip and a coned flame retention head the small end of which is completely open and faces the nozzle tip. Perforated air deflectors curve outwardly from the auxiliary air inlet to distribute the air throughout the zone behind and around the coned flame retention head. Slots each having an outwardly inclined vane adjacent one of its margins extend longitudinally of the head and open at both the periphery and the small end of the head to direct auxiliary air from this zone into an axially swirling pattern of motion within the head, and additional openings of circular configuration are disposed in a ring about the conical head in the vicinity of but spaced from its large end to direct auxiliary air toward the axis of the head.

CROSS REFERENCE TO RELATED APPLICATIONS

The disclosure of this application is related to the disclosures of an application Ser. No. 128,720 of Engene C. Briggs entitled "Portable Heater" and an application Ser. No. 128,734 of Eugene C. Briggs entitled "Fuel Burner," both being filed concurrently herewith.

BACKGROUND OF THE INVENTION

This invention relates to combustion apparatus of the type in which fuel in fluid form and air are supplied to a burner assembly including a nozzle from which the fuel is projected and burned in a restricted combustion zone to provide heat for such applications as residential air conditioning and heating units or systems, water heaters, small steam generating systems, etc.

Nozzle type burners have heretofore been employed in various kinds of equipment and such burners have recognized advantages in the areas of structural simplicity, performance flexiblity, etc. However, difficulties have been encountered in obtaining highly efficient air-fuel mixtures with such apparatus.

These difficulties are more pronounced in applications where the combustion zone is dimensionally restricted, because in these instances there is less opportunity for the occurrence of random mixing phenomena. As a result, earlier attempts to employ nozzle type burner apparatus in compact combustion equipment have often been characterized by incomplete combustion with consequent contamination of the exhaust stream and by low thermal efficiency. Difficulties also have been encountered in connection with the tendency of such equipment toward the creation of deposits on the walls of the combustion zone, which deposits give rise to random irregularities in burning performance.

Although such difficulties have existed in connection with apparatus for burning both fuel oil and gas, they have been particularly pronounced where oil has been employed as the fuel. The liquid state of this fuel is an impediment to the obtaining of an efficient air-fuel mixture in a small combustion space. Moreover, the auxiliary apparatus such as fuel and air pumps required when oil burners are employed occupy significant amonts of space, and in some equipment, difficulties have been encountered in correlating the space and location requirements of such auxiliary apparatus with the space and location requirements of other components of the equipment. As a result, there has been a trend toward the use of gas in applications where compactness and a high degree of cleanliness in burning are required, even though the use of gas often is accompanied by complicating factors such as safety hazards and installation complexity.

An important example of this trend is provided by the absorption cycle chiller units employed in residential air conditioning systems. These units must as a practical matter be quite compact. Yet the equipment components required for performing the base functions of the absorption cycle are themselves space consuming so that little space is left for the combustion apparatus. Such space limitations have, prior to the present invention, lead to the predominant use of gas fired units.

SUMMARY OF THE INVENTION

An object of this invention is to provide combustion apparatus having a highly efficient and compact burner assembly supplied with air and fuel from a remotely mounted supply assembly, with both of the assemblies being disposed at convenient locations within a housing and being accessible for servicing through an opening in the housing.

Another object of the invention is to provide a nozzle type burner assembly with an auxiliary air supply system in which a large volume of air enters the burner tube from one side but is so distributed about the interior of the nozzle end of the burner tube as to insure uniform operation and to avoid blowing unburned fuel against the opposite side of the burner tube.

Yet another object of the invention is the provision of oil fired combustion apparatus in which pressurized auxiliary air from a remotely located blower is introduced into a nozzle type burner assembly and caused to flow in paths which assure an efficient air-oil mixture in a small combustion zone and which protect against the impingement of incompletely burned oil particles against surfaces of the apparatus.

A burner assembly for combustion apparatus according to the invention includes a cylindrical member or burner tube having an open outlet end, a nozzle coaxial with the burner tube for projecting fuel toward the open outlet end of the burner tube, a flame retention head within the burner tube and located in front of the nozzle, and an auxiliary air inlet entering the burner tube from a side wall thereof at a location near the nozzle. This burner assembly is mounted on the heat receiver component of the equipment in which the combustion apparatus is employed.

The supply assembly for the combustion apparatus of the invention is a separate package of components mounted at another location within the housing of the equipment in which the combustion apparatus is employed. It includes means for supplying fuel and primary air for the nozzle of the burner, an electrical control section and an auxiliary air blower, all arranged in a compact assemblv accessible for service through an opening in the equipment housing. Fluid conduits and electrical cables connect the supply assembly components with appropriate fittings on the burner assembly.

The auxiliary air inlet into the burner tube is disposed approximately at right angles to the burner tube axis but it is provided with novel air flow distributor means which divide the incoming auxiliary air into multiple flow paths serving to distribute the air uniformly through the burner tube zone on the nozzle side of the flame retention head.

The flame retention head is a thin walled member having the general configuration of a frustum of a cone. The large end of the cone has a diameter corresponding to that of the interior of the burner tube and it is mounted against the wall of the tube. The smaller end of the coned head is disposed a short distance in front of the nozzle and is completely open and of a diameter such that the material issuing from the nozzle enters the interior of the flame retention head without contacting the walls thereof.

In a preferred form, the interior of the flame retention head is constituted by a conical surface of resolution uninterrupted by inwardly protruding elements or portions. However, longitudinal slots are located at regularly spaced intervals about the axis of the head, and each of these slots is open to the small end of the head. The material of the head is bent outwardly at an angle along the margin of each of the slots to provide a series of vanes skewed relative to the axis of the head. With this configuration, air from the pressurized zone behind and around the flame retention head is caused to enter the interior of the head in a swirling pattern which serves to inhibit lateral flame expansion and to bring about an improved air-fuel mixture in the burning zone.

The preferred flame retention head also includes additional air passages located near but spaced from its larger end. These additional air passages may be simple holes the axes of which intersect the longitudinal axis of the flame retention head. The holes preferably are spaced regularly about the circumference of the head and at least some of them may intersect the ends of the longitudinal slots remote from the small end of the head. The additional air passing through the holes is driven directly into the flame area and minimizes flame expansion so that the flame is held in close proximity to the conical head. This additional air also provides a shield for preventing impingement of raw or incompletely burned fuel against the wall of the downstream portions of the head and burner tube so as to minimize carbon deposits thereon.

The nozzle itself preferably is an aspirator nozzle of the type in which air under pressure is caused to swirl at high velocity through and out of a passage surrounding a centrally located oil conduit. As the air issues from the nozzle end, it entrains oil particles and the oil-air mixture is projected toward the outlet end of the burner tube.

In constructions embodying such nozzles, it is preferred that the direction of swirl of the primary air issuing from the nozzle tip be opposite to the direction of swirl of the secondary air guided into the interior of the flame retention head by the outwardly inclined vanes at the margins of the longitudinal slots which extend to the small inlet end of the head. This counterflow arrangement promotes oil droplet breakdown and efficient mixing of the air with the dispersed oil particles.

The spacing of the burner tip from the small end of the flame retention head and the sizes of the vane ends at this portion of the head also are factors which are relevant in connection with obtaining maximum performance. It is preferred that the nozzle end be spaced from the small end of the flame retention head a distance such that the visible portion of the flame is located at or a short distance from the small end of the head. The diameter of the small end of the head should be small, and the vane ends should be of substantial length and have substantial inclinations. The mass of swirling air flow achieved with such a construction is large and results in good performance.

A more complete understanding of these and other features and advantages of the invention will be gained from a consideration of the following detailed description of an embodiment illustrated in the accompanying drawings.

BRIEF DESCRIPTION OF THE DRAWINGS

FIG. 2 is a horizontal cross sectional view, taken along the line 2—2 in FIG. 1 and illustrating fuel burner and supply assemblies of the invention in relation to the housing and heat receiver of the equipment of FIG. 1.

FIG. 9 is a cross sectional view taken generally along the line 9—9 in FIG. 6, but illustrating a fuel supply to the nozzle head as being in this plane and illustrating in plan a flame retention head in the burner assembly.

FIG. 10 is a detailed cross sectional view, taken along the line 10—10 in FIG. 9 and illustrating air flow and fuel passages in the nozzle component of the burner assembly.

DETAILED DESCRIPTION OF ILLUSTRATED EMBODIMENT

Figure 1:
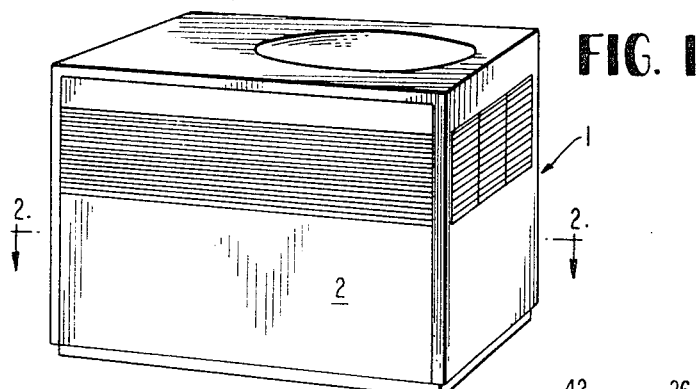
FIG. 1 is a perspective view of a water chiller for an air conditioning system, which water chiller includes combustion apparatus constructed in accordance with the invention.
Figure 4:
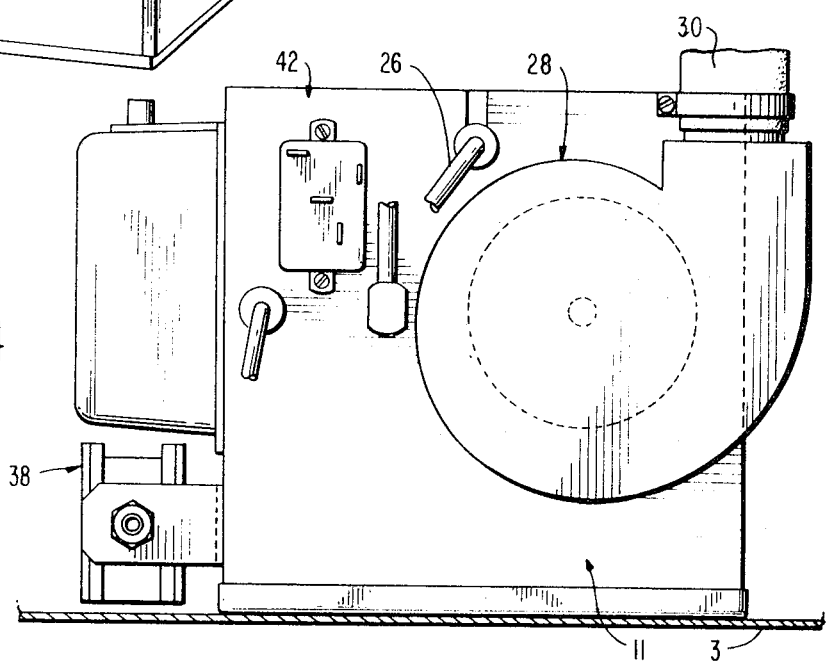
FIG. 4 is a similar view of the supply assembly taken along the line 4—4 in FIG. 3.

Although the invention is susceptible of being applied in a variety of environments, it is especially suited to applications where compactness and highly efficient combustion are required. The compact water chiller 1 of FIG. 1 is a particularly advantageous application, and it will be helpful to describe the invention as it is embodied in this unit.

The water chiller 1 is a small unit operating on an absorption cycle to chill water piped to and from the unit as a part of a residential air conditioning system. As is well known, such absorption cycles require the presence of a generator unit where relatively high pressures and temperatures are maintained and where an absorbed vapor such as ammonia is driven from a solution. The vapor is then condensed to a liquid and passed through an expansion valve to an evaporator where it is disposed in heat receiving relationship to the water to be chilled. The low pressure vapor then is again put into a liquid solution in an absorber, and the liquid is pumped back to the generator to complete the cycle.

As will be evident, a number of components are required for carrying out the various functions of the cycle just described. Consequently, the space available within the housing 2 of the compact unit of FIG. 1 for use in supplying the necessary heat to the generator is quite limited.

Referring now to FIG. 2, it will be seen that the combustion apparatus for supplying heat to the generator of the chiller is made up of equipment components located near the bottom 3 of the chiller unit 1 and that these equipment components are arranged to be accessible at one side 4 of the housing 2 provided with a conventional access panel (not illustrated) which may be removed when it becomes desirable to inspect or service the equipment.

Figure 5:
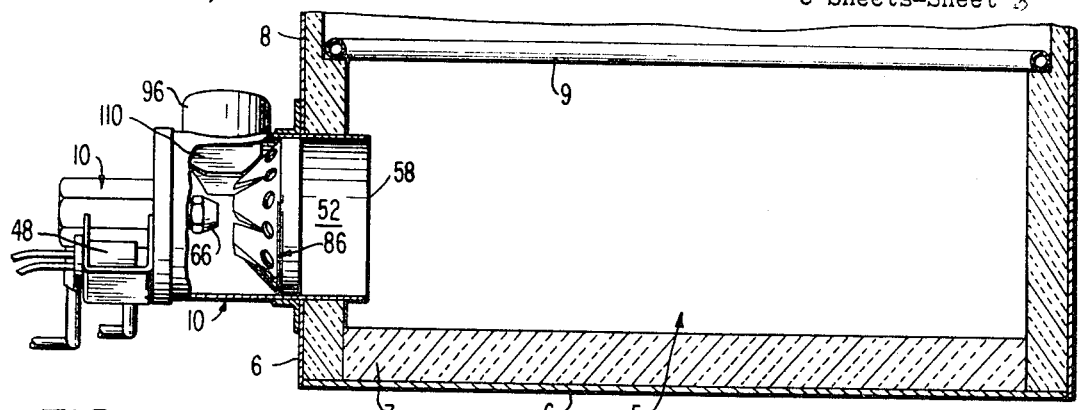
FIG. 5 is a vertical cross sectional view illustrating the relationship between the fuel burner assembly and the heat receiving chamber for the generator element of the chiller of FIG. 1.

In FIGS. 2 and 5 the heat receiver for the generator of the chiller is designated generally at 5. It includes metal housing components 6 lined with refractory material 7. This heat receiver is in the form of a vertically oriented cylinder, and it will be understood that the main body of the generator 8 is disposed immediately above and coaxially with the heat receiver so that the heat supplied to the heat receiver is made available in an efficient way to the main heat transfer components of the generator. These heat transfer components form no part of the present invention and are represented schematically at 9 in FIG. 5. The vertical extent of heat receiver 5 may be on the order of six or seven inches.

The combustion apparatus includes two basic assemblies, a burner assembly 10 supported by the heat receiver 5 and a supply assembly 11 spaced from the burner assembly and supported on the bottom 3 of the chiller housing 2. Fluid conduits and electrical cables connect the two assemblies together in a manner to be described more fully below.

The burner assembly 10 extends into an opening in the vertical wall of the heat receiver 5 as illustrated in FIGS. 2 and 5. This burner assembly includes a nozzle body 12, provided with a fuel inlet fitting 14, a primary air inlet fitting 16, and also a fitting 18 through which supplementary or auxiliary air may be admitted.

The supply assembly 11 for delivering the required fluids to the fittings 14, 16 and 18 includes a motor 20 held in place by a clamp system 22 and having driven output shaft means at both ends thereof. The output at one end of the motor 20 serves to drive a primary air pump or compressor 24 of a vane type described more fully in U.S. Pat. 3,256,003 granted to Eugene C. Briggs on June 14, 1966. The disclosure of such patent is incorporated herein by reference and the patent may be examined in order to gain a detailed understanding of the interior construction of the compressor 24. It will suffice here to point out that the compressor 24 receives air from the interior of the casing 2 of the chiller unit 1 and delivers the compressed air to the primary air inlet fitting 16 of the burner assembly through a line or conduit 26. The compression achieved in the compressor 24 need not be high, it having been found that a pressure of about four pounds per square inch gauge ordinarily is sufficient.

The other output end of the motor 20 drives an auxiliary air blower unit indicated generally at 28 as a centrifugal pump. This unit receives air through an axial opening (not illustrated) and delivers it at an increased pressure through a peripheral outlet to a hose 30 leading to the auxiliary air inlet fitting 18 of the burner assembly.

Fuel oil is supplied from a small piston-solenoid type fuel pump 32 on the supply assembly 11. This pump includes an inlet fitting 34 to which a line from a suitable reservoir is attached. These latter elements are conventional and have not been illustrated in the drawings. The output from the pump 32 is connected to a line 36 which leads to a regulator 38, and the regulator 38 is connected to the oil inlet fitting 14 of the fuel burner by way of a line 40.

The fuel regulator 38 preferably is a demand regulator of the diaphragm valve type illustrated and described in U.S. Pat. 3,298,418, granted to Eugene C. Briggs on Jan. 16, 1967, the disclosure of which patent is incorporated herein by reference. This regulator 38 supplies constant fuel flow to the nozzle regardless of head variations, so long as the air system is operating properly to impose a demand for the presence of a supply of fuel within the nozzle. However, the regulator shuts off the flow when the primary air supply is interrupted, and there is no danger of fuel being delivered to the nozzle after the conditions necessary for combustion have ceased to exist.

Figure 3:
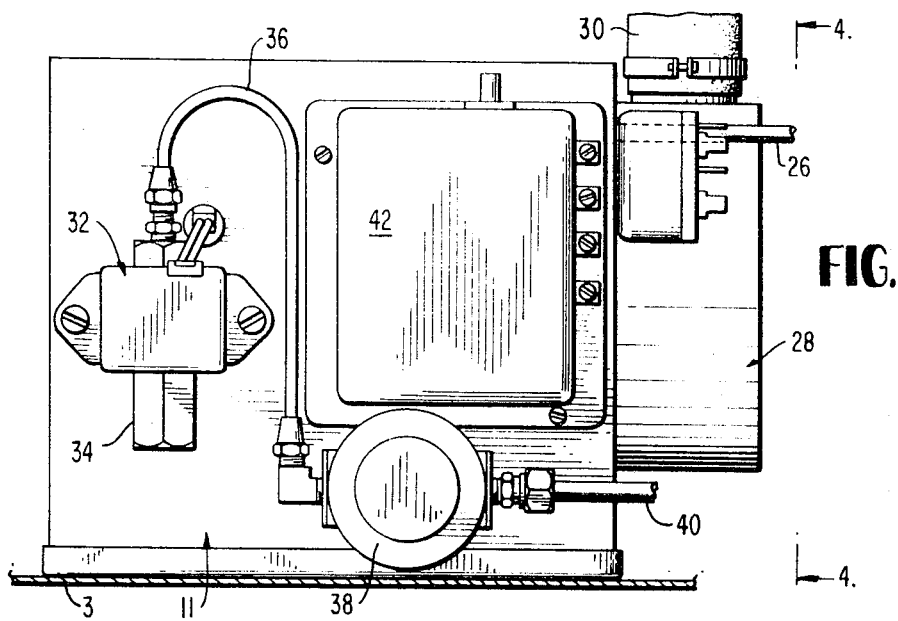
FIG 3 is a partial elevational view, taken from the direction 3—3 in FIG. 2 with an access panel of the chiller housing being removed, and showing the components of the supply assembly for supplying the burner assembly with fuel and air.

The electrical system for controlling the operation of equipment may be located on the supply assembly at 42 in FIGS. 2 and 3. These controls are conventional in nature and need not be described in detail here.

It should be noted however that the burner assembly includes an igniter component 44 connected to a cable 46 which leads into the control system and that the burner assembly also includes a detector 48 (e.g. a cadmium cell unit) which also is attached to a cable 50 leading to the control. The igniter component 44 operates to provide an ignition arc in the beginning of a burner operation cycle, and the retector 48 operates to shut down the fuel supply in the event that the flame should go out unexpectedly. The controls further serve to correlate the operations of the motor 20 and the fuel pump 32 with the requirements of the burner and the system being served by the burner.

The construction and organization of the elements of the burner assembly 10 are best illustrated in FIGS. 5–12 of the drawings.

A cylindrical member or burner tube 52 extends through a cylindrical opening in the wall of the heat receiver 5 and is attached to a mounting member 54 detachably secured to the exterior of the heat receiver 5 by such conventional means 56 as screws or the like.

The inner or outlet end 58 of the burner tube 52 is in open communication with the interior of the heat receiver 5. However, the outer end of the burner tube is closed by a member 60 having a central opening for receiving the nozzle structure.

The nozzle head or body element 12 fits closely within the central opening in the closure 60 and may be permanently secured to the closure in an appropriate manner for sealing the opening as best shown in FIG. 9. The nozzle body 12 is hollow and includes both a chamber 62 communicating with the oil inlet fitting 14 and a chamber 64 communicating with the primary air inlet fitting 16. The front end of the nozzle body 12 is provided with an internally threaded central opening for cooperation with an externally threaded rear end portion of a nozzle tip 66.

A nozzle core element 68 is disposed centrally of the assembly and fits closely within an opening at the rear end of the nozzle tip and within a seal 70 separating the oil chamber 62 from the air chamber 64. The position of the core 68 within the body 12 and the attached tip 66 is established by a radial collar 72 on the core and a compression spring 74 arranged to press the core forwardly until a forwardly directed face of the collar 72 abuts against the rear end of the threaded portion of the nozzle tip 66.

The front end portion of the nozzle core element 68 has an external diameter less than the diameter of the opening in the corresponding portion of the tip 66 to provide therebetween another air chamber 76. Air flows from the chamber 64 to the chamber 76 through inclined passageways 78 (FIGS. 9 and 10) through the collar portion 72. These inclined passageways serve to produce a high velocity air flow in a swirling pattern through the chamber 76 and through an orifice 80 at the outlet end of the nozzle tip 66.

The core element 68 additionally includes at its front end a tip portion 82 which protrudes into the orifice 80, and an oil passage 84 leads through the center of the core element 68 from the chamber 62 to the orifice 80. The swirling air flow from the chamber 76 out of the orifice 80 in the nozzle tip produces an aspiration effect which causes oil to flow through the passage 84. As a result, a mixture of air and atomized oil is projected forwardly from the nozzle tip toward the outlet end 58 of the burner tube 52.

A flame retention head 86 is disposed a short distance in front of the outlet end of the nozzle tip as illustrated in FIGS. 5 and 9. This head 86 is formed of heat resistant thin wall material such for example as thirty gauge stainless steel. Its shape is basically that of a frustum of a cone and it is preferred that the cone angle (i.e. inclination relative to axis) be on the order of about forty-five degrees.

The small end of the coned section of the flame retention head 86 defines an unobstructed opening facing toward the nozzle tip 66, while the large end is also completely open and faces toward the outlet end 58 of the burner tube 52. The diameter of the large end of the head 86 corresponds to the internal diameter of the burner tube 52, and an attachment ring 88 of cylindrical configuration seals this end of the head against the wall of the tube.

Figure 8:
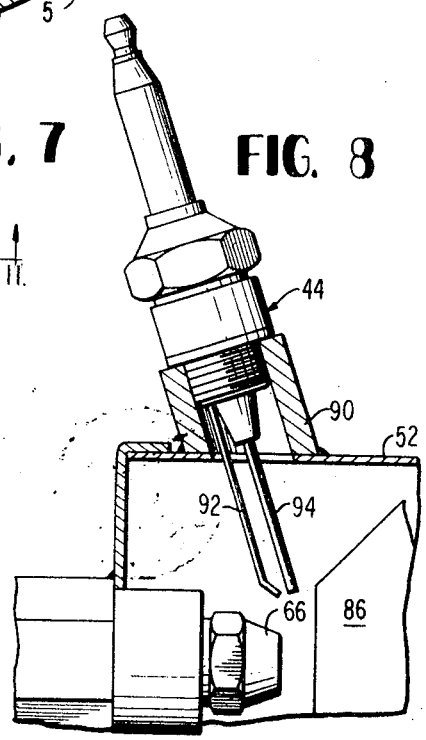
FIG. 8 is a detailed cross sectional view, taken along the line 8—8 in FIG. 6 and illustrating an igniter component of the burner assembly

As indicated in FIG. 8, the igniter component 44 is threaded into a tubular mount 90 carried by a rear portion of the burner tube 52. The igniter component 44 includes electrodes 92 and 94 which project into the interior of the tube 52 to a location in the vicinity of the outlet end of the nozzle tip 66. Current may be supplied to the electrodes 92 and 94 at sufficient voltage to strike an arc between these electrodes when it is desired to initiate a burning cycle.

Also mounted on a rear portion of the burner tube 52 is the auxiliary air inlet fitting 18 (FIGS. 5, 7, 11 and 12). This fitting 18 is a cylindrical passage or tube 96 which mates with a correspondingly sized opening in the burner tube 52. The axis of the tube 96 is transverse to the axis of the burner tube 52 and is located between the nozzle tip 66 and the small end of the flame retention head 86. The diameter of the tube 96 is sufficiently large that marginal portions thereof are directed respectively toward the nozzle tip 66 and toward the conical section of the flame retention head 86.

Figure 12:
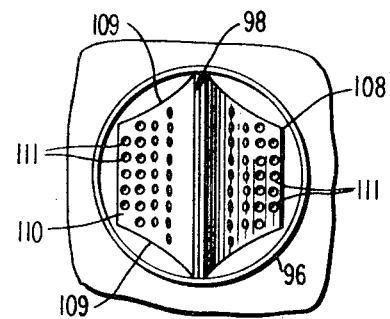
FIG. 12 is an end view of the auxiliary air supply fitting of FIG. 11 as it appears from the outer end thereof.
Figure 11:
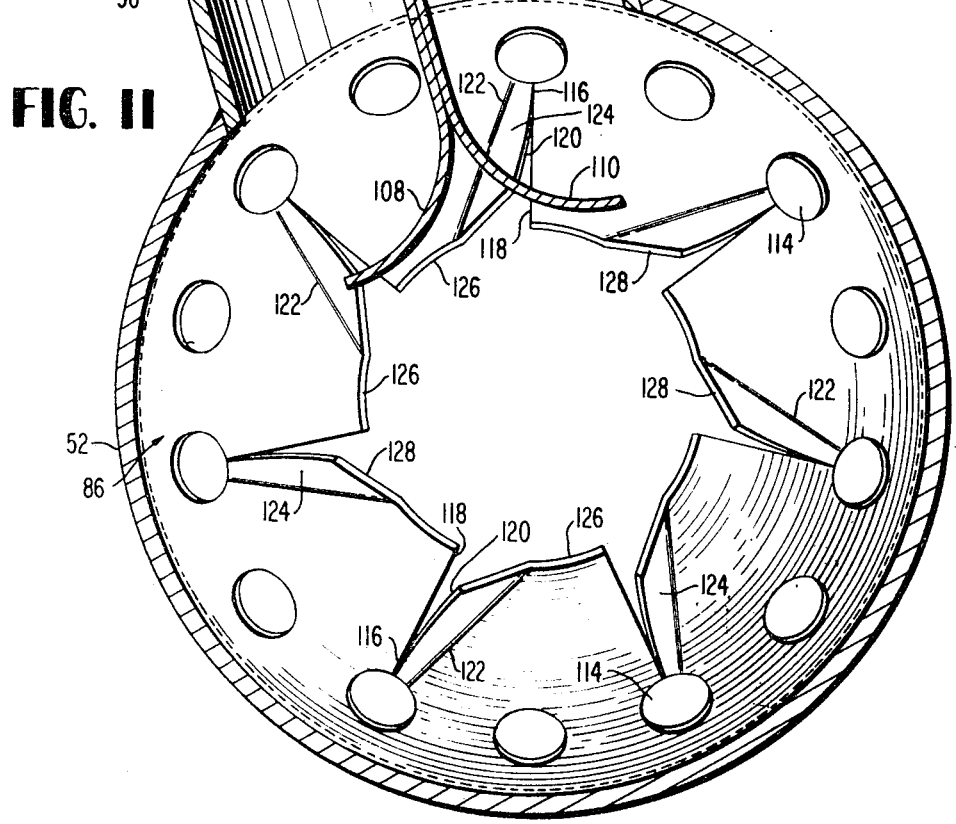
FIG. 11 is a cross sectional view taken along the line 11—11 in FIG. 7 to show the inlet end of the flame retention head in elevation and to illustrate an auxiliary air supply fitting in cross section.
Figure 6:
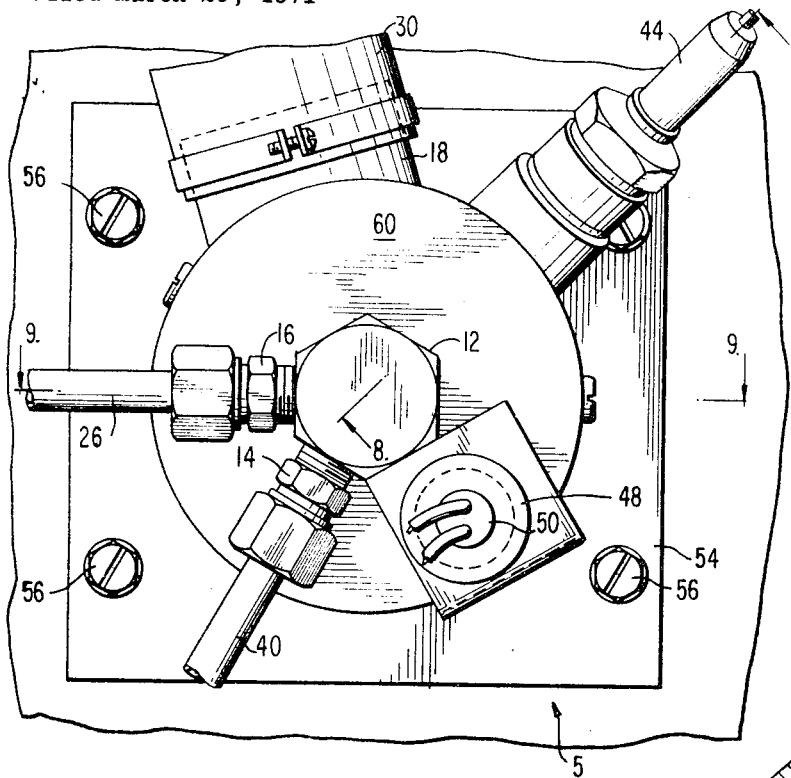
FIG. 6 is an end elevational view of the burner assembly shown in FIGS. 2 and 5.
Figure 7:
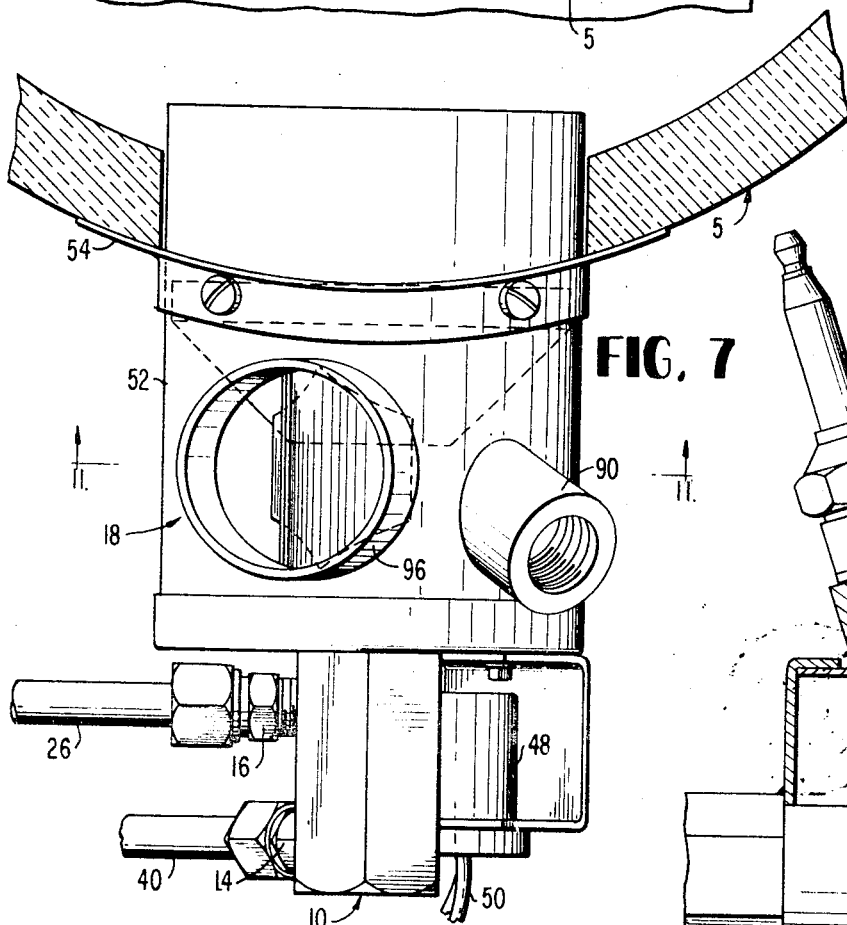
FIG. 7 is a plan view of this burner assembly.

As best shown in FIGS. 11 and 12, the air flow distributor means 98, in the form of a pair of sheet members 100 and 102, extend centrally through the tube 96. The outer ends 104 and 106 of the sheet members 100 and 102 are generally planar and extend in abutting relationship to each other along a plane containing both the axis of the auxiliary air inlet passage 96 and the axis of the burner tube 52. The widths of these outer end portions 104 and 106 correspond to the diameter of the tube 96 and their edges are attached to the tube wall.

The inner end portions 108 and 110 of the sheet members 100 and 102 have special configurations for effecting distribution of the auxiliary air through the burner tube zone 112 at the rear and about the exterior of the flame retention head 86. Each of the sheet member inner end portions 108 and 110 is curved outwardly (FIG. 11) and each is provided with tapered front and rear edges 109 and with a multiplicity of holes 111 as illustrated in FIG. 12. With this construction, some air is deflected in a counterclockise direction (as viewed in FIG. 11) by the inner end portion 108 of the sheet member 100, some air is deflected in a clockwise direction by the inner end portion 100 of the sheet member 102, some air passes directly through the holes 111, and some air passes beyond the tapered front and rear edges of the deflector portions 108 and 110.

It should be noted that in this compact system the actual inlet tube 96 is disposed on an upper side portion of the burner tube 52 where it may be reached easily from the access side 4 of the chiller housing 2 and where it presents no intrusion into the very limited vertical space available between the housing bottom 3 and the burner tube 52. Yet, the novel air flow distributor means 98 causes the auxiliary air admitted to the zone 112 at the rear of the burner tube 52 to be distributed evenly through this zone. The significance of this feature can be more fully appreciated when it is noted that, in the absence of the flow distributor means 98, a large volume of cool auxiliary air flowing across the axis of the burner tube would cause wet oil to be deposited on the wall components opposite the auxiliary air inlet.

The pattern of flow of auxiliary air from the zone 112 to the interior of the flame retention head 86 is established by features of the head construction which now will be explained in detail with particular reference to FIGS. 9 and 11 of the drawings.

One set of auxiliary air openings 114 through the coned flame retention head 86 is located near the larger end of the head. These openings 114 are circular holes regularly spaced about the circumference of the head. Although there are fourteen of the holes 114 in the illustrated embodiment, it will be understood that the number of holes provided in any given instance will be determined on the basis of the air requirements for efficient combustion of fuel at the rate appropriate for the system in which the burner is used.

The head portion 86 also is provided with another set of auxiliary air passages or slots by slitting the head longitudinally from alternate ones of the holes 114 to the small rear end of the head. Thus, there are seven of these slits 116 in the illustrated embodiment. Viewing the coned head 86 from its rear end (FIG. 11), it will be seen with respect to each of the slits that the edge 118 thereof which trails in a counterclockwise sense lies in a longitudinal plane containing the axis of the head and is not deflected from the coned shape. However, the material adjacent the opposite marginal edge 120 is bent outwardly along a bend line 122 to provide an inclined vane 124.

With this construction, the opposite edges 118 and 120 of the slits 116 cooperate to define forwardly converging longitudinal slots or air passage mouths for receiving the pressurized air from the zone surrounding the flame retention head 86, and the inclined inner faces of the vanes 124 impart to the air flowing thereover a swirling pattern of motion about and along the axis of the burner tube 52. Since the slits extend all the way to the completely open small end of the coned flame retention head 86, air may move to the inner flow-controlling surfaces of the vanes 124 not only from the zone of circumference of the coned head but also from the zone immediately behind the head. Thus, the swirling action is imparted to substantial masses of flowing air without any abrupt flow direction changes and in the absence of any obstructions to flow into the zones of action of the vanes. Moreover, it is to be noted that the interior of the coned head 86 is unobstructed by inward protrusions which would obstruct the spiral flow established by the vanes 124.

An explanation of exemplary dimensional characteristics of the flame retention head will serve to further clarify the construction illustrated in the drawing. The larger diameter of this coned head 86 is 2¾ inches, the angle of inclination or cone angle is 45°, and the axial extent of the cone (distance between large and small ends of cone as projected onto a plane parallel to axis) is 26/32 inch. The holes 114 have diameters of about 9/32 inch and have axes located about 29/32 inch forwardly of the rear end of the head 86 as measured along the sloping cone wall. The angular extent of those rear edge portions 126 of the coned head 86 which are not bent outwardly to form the vanes 124 is slightly greater than 180°. The rear end edges 128 of the vanes 124 extend outwardly at such angles that the juncture points of these edges 128 with the slit edges 120 define a circle having a diameter of 1 15/32 inches, and both the widths and the angles of inclination of the vanes relative to the coned surface of revolution decrease as one proceeds forwardly from the rear end of the head.

Referring again to FIG. 2, it should be noted that the portion of the periphery of the heat receiver 5 occupied by the burner assembly 10 is quite small. In the particular chiller 1 illustrated in the drawings, a single burner assembly is adequate for supplying the heat requirements of the system and the illustrated arrangement of a single burner assembly located adjacent the same side 4 of the housing 2 as the supply assembly 11 is particularly advantageous. However, it will be evident that the combustion apparatus of the invention may, if desired, include additional burner assemblies served by a single supply assembly. For example, another burner assembly 10 may be mounted on another portion of the periphery of the heat receiver 5 and suitably connected to the supply assembly 11 by fluid conduits and electrical cables.

SUMMARY OF BURNER OPERATION AND ADVANTAGES

When operation of the combustion apparatus is to be commenced, the electrical control assembly 42 causes the motor 20 and the fuel pump 32 of the supply assembly 11 to be energized. As the outputs at the ends of the motor 20 rotate, primary air flows from the pump 24 through the line 26 to the fitting 16 on the nozzle of the burner assembly 10, and auxiliary air flows from the blower 28 through the hose 30 to the auxiliary air inlet fitting 18.

The primary air entering the fitting 16 is driven through the inclined passages 78 in the collar portion 72 of the nozzle core 68 and swirled forwardly and clockwise about the axis of the nozzle to issue from the orifice 80 in the nozzle tip 66. This produces an aspirating effect which lowers the pressure in the oil line 40 and actuates the diaphragm valve means in the demand regulator device 38 to permit oil to flow from the pump 32 to the fitting 14 on the nozzle of the burner assembly 10. The high velocity primary air flow at the nozzle orifice 80 atomizes the oil drawn from the passage 84 of the nozzle core and a stream of air and tiny oil particles is projected forwardly from the nozzle tip into the opening at the rear of the flame retention head 86.

In the meantime, the igniter 44 will have been energized by the electrical control assembly 42 to strike an arc between the igniter electrodes 92 and 94 located in the vicinity of the nozzle tip 66, so that combustion will be initiated as soon as oil begins to issue from the nozzle. After ignition has been achieved, the igniter 44 is de-energized and remains idle until it is desired to start a new burning cycle.

The auxiliary air entering the tube 96 which constitutes the fitting 18 on the burner tube 52 is divided and distributed by the means 98 so that the entire zone 112 behind and around the flame retention head 86 is supplied with pressurized air. The action of the perforated deflectors 108 and 110 in dispersing the air into multiple flow directions, some of which actually are in opposition to each other, has the overall effect of making the auxiliary air available from all portions of the zone 112. It is noteworthy that this effect is achieved without any enlargement of the burner assembly diameter and without causing any tendency for unburned oil particles to be blown against the burner tube wall opposite the auxiliary air inlet.

The flow patterns of the auxiliary or supplementary air from the zone 112 into the interior of the flame retention head 86 also are of importance. Some of the air will of course pass directly through the open rear end of the flame retention head 86 along with the stream issuing from the nozzle tip 66. Additional increments of supplemental air are acted upon by vanes 124 to produce a swirling flow having a counter clockwise direction as viewed from the rear of the retention head. This flow exerts a confining effect upon the flame in a radial sense, scours the interior surface portions of the flame retention head 86, and further improves the air-fuel mixture in the flame area. In the latter connection, it is noted that the direction of swirl imported by the vanes 124 is opposite to the direction of swirl provided by the passages 78 in the air channel of the nozzle, thereby promoting more efficient mixing.

Substantial additional increments of supplementary air are driven through the holes 114 toward and along the central axis to further confine the flame and carry the combustion of the fuel to completion. This air flow through the holes 114 also provides a shield for the cooler metal surfaces located downstream so that these surfaces are protected against carbon deposits.

From visual observations it has been established that the flame produced is a small, bright yellow flame of a shape indicative of a vortex. This intense flame occupies a central portion of the flame retention head. Burning efficiency is further attested to by the exceptional cleanness of the exhaust gases.

Although the illustrated embodiment of the invention is particularly adapated for the burning of oil or other liquid fuel, it will be appreciated that the invention also is suitable for use in the burning of gaseous fuels. The vastly improved air-fuel mixtures achieved by the structures of the invention contribute to the efficiency of combustion of gaseous fuel in the same manner they do for liquid fuel.

It will be appreciated also that the invention may be applied in many environments other than the water chiller illustrated in the drawings. This particular application does, however, illustrate the unique flexibility and compactness characteristics of the new combustion apparatus. It will be appreciated that the remarkable decrease in required combustion zone volume achieved by the burner assembly is a factor which will make it possible to utilize this burner in situations where the nozzle type burners of the prior art were unsuitable.

Moreover, the separation of the burner and supply assemblies into independently mounted component packages greatly enhances installation flexibility and makes is possible to use the new combustion apparatus in many oil fired appliances where severe space limitations exist. This separation feature also makes possible the construction of systems provided with multiple burner assemblies served by a single supply assembly. Such systems are particularly attractive where large heat input requirements exist or where large scale modulation of the heat input is required.

Still other modifications and variations will suggest themselves to persons skilled in the art. It is intended therefore that the foregoing detailed description of the illustrated embodiment be considered as exemplary only and that the scope of the invention be ascertained from the following claims.

What is claimed is:

1. A water chiller operating on an absorption cycle comprising:
    a housing; and
    heat transfer means in said housing,
        a heat generator,
        a burner tube having a closure and an outlet end operatively connected to said heat generator,
        a nozzle operatively associated with said closure end of said burner tube for generating a flame and projecting said flame inwardly of said burner tube,
        a fuel supply in operative relationship with said nozzle, a flame retention head cooperating with said burner tube in communication with said nozzle for imparting a swirling pattern of air movement about and along the axis of the flame retention head, said flame retention head forming an air chamber with the interior of said burner tube in the zone communicating with said nozzle,
        an air supply in operative relationship with said burner tube for directing air to said zone,
        air flow distributor means having deflector portions for introducing incoming air in opposite circumferential directions about the axis of said burner tube in said zone communicating with said nozzle, and
        a control assembly within said housing for regulating fuel, air and ignition for said heat generator.

2. Combustion apparatus comprising:
a supply assembly including an air blower;
a fuel burner assembly spaced from said supply assembly and including
> a generally cylindrical burner tube,
> a closure on the opposite end of said burner tube,
> a fuel nozzle on said closure and extending inwardly of said burner tube in generally coaxial relation thereto,
> a flame retention head of thin material disposed between said nozzle and the outlet end of said burner tube and being formed into a generally conical section coaxial with said burner tube, said conical section having a large end the diameter of which corresponds to the diameter of the interior of said burner tube and a small end defining an unobstructed opening facing said nozzle,
> a cylindrical air inlet passage for directing air to said burner tube between said closure and said large end of said conical section of said flame retention head, and
>> air flow distributor means having a pair of deflector portions adjacent the inner end of said air inlet passage and being directed outwardly in opposite directions from a plane containing the axes of of said burner tube and said inlet passage to direct portions of the incoming air in opposite circumferential directions about the axis of said burner tube, and
> conduit means connecting said air blower of said supply assembly to said air inlet passage of said burner assembly.

3. A combustion apparatus according to claim 2 wherein said deflector portions further include a plurality of holes therethrough for admitting portions of the incoming air radially toward the axis of said burner tube.

4. Combustion apparatus according to claim 3 wherein said flame retention head is provided with a ring of regularly spaced holes therethrough at a location close to but spaced from the large end of said conical section and the material of said conical section is slit longitudinally from at least some of said holes to the small end of the conical section, portions of the material of said conical section each bounded by an edge of one of said slits and by an inclined bend line converging toward such edge from the small end of the conical section being bent outwardly along said bend lines to form vanes, all of said vanes having inner surfaces inclined in the same direction about the axis of the head for imparting a swirling motion to air passing along said surfaces and into the interior of the head.

5. Combustion apparatus according to claim 2,
wherein the axis of said cylindrical air inlet passage intersects the axis of said burner tube at a location between the smaller end of said conical section of said flame retention head and the inner end of said nozzle, the diameter of said cylindrical air inlet passage being sufficiently large that marginal portions of said cylindrical air inlet passage are directed respectively toward said nozzle and toward said conical section of said flame retention head; and
wherein said air flow distributor means is formed by a pair of thin sheets having outer end portions extending in abutting relation to each other along said plane containing the axes of said burner tube and said cylindrical air inlet passage, said sheets having inner end portions bent outwardly from said plane to form said deflector portions, said outer end portions of said plates having widths corresponding to the diameter of said cylindrical air inlet passage, and said inner end portions of said sheets being tapered so that portions of the incoming air may enter directly into the interior of the burner tube at locations beyond the edges of said tapered inner end portions of said sheets.

6. Combustion apparatus according to claim 5 wherein said nozzle is provided with means for supplying fuel and primary air to an outlet opening at the inner end thereof coaxial with said burner tube.

7. Combustion apparatus according to claim 2,
wherein said supply assembly additionally includes a fuel pump, a motor having outputs at opposite ends thereof, and a primary air pump connected to one of said motor outputs, said air blower being connected to the other of said motor outputs;
wherein said nozzle is provided with fuel and primary air passages therethrough leading to an outlet opening coaxial with said burner tube; and
wherein there are additionally provided means operatively connecting said fuel pump of said supply assembly to said fuel passage of said nozzle, and conduit means connecting said primary air pump to said primary air passage of said nozzle.

8. Combustion apparatus according to claim 7,
wherein said nozzle is an aspirator nozzle; and
wherein said means operatively connecting said fuel pump to said fuel passage of said nozzle includes demand flow regulator means mounted on said supply assembly for blocking flow of fuel to said nozzle in the absence of air flow from said primary air pump to said primary air passage of said nozzle.

9. Combustion apparatus according to claim 7, including an igniter mounted on said burner tube and having electrodes extending into the interior of said burner tube to a location near said nozzle; and wherein said supply assembly includes control means for energizing said igniter to initiate a combustion cycle.

10. In an apparatus having a housing access to the exterior of which may be gained from one side thereof, and a heat receiver within and adjacent the bottom of said housing, improved combustion apparatus comprising:
a supply assembly within and adjacent said side of said housing and including
> a primary air pump,
> an auxiliary air blower,
> an oil pump, and
> an electrical control assembly;
a fuel burner assembly within said housing mounted on said heat receiver and including
> a generally cylindrical member extending through an opening into said heat receiver and protruding outwardly from said heat receiver adjacent said side of said housing, said cylindrical member having an open inner end communicating with the interior of said heat receiver,
> a closure on the outer end of said cylindrical member,
> an aspirator nozzle on said closure and extending inwardly of said cylindrical member in generally coaxial relation thereto, said nozzle having oil and primary air passages therethrough leading to an outlet orifice at the inner end of said nozzle,
> a cylindrical auxiliary air inlet passage extending transversely through an opening in said cylindrical member in the vicinity of said nozzle,
> air flow distributor means having a pair of deflector portions adjacent the inner end of said auxiliary air inlet passage and being curved outwardly in opposite directions from a plane containing the axes of said cylindrical member and said auxiliary air inlet passage to channel portions of the incoming air in opposite circumferential directions about the axis of said cylindrical member, said deflector portions additionally being provided with a plurality of holes therethrough for admitting portions of the incoming air radially toward the axis of said cylindrical member;

a flame retention head generally coaxial with and intermediate the ends of said cylindrical member and including a hollow, open-ended, generally conical portion having a large end the diameter of which corresponds to the diameter of the interior of said cylindrical member and a small end defining an unobstructed opening facing toward said nozzle, said conical portion being provided with slots at spaced locations about the circumference thereof, each of said slots communicating with and extending forwardly from the small open end of said conical portion with one marginal edge of the slot being located in a plane containing the axis of the flame retention head and the opposite marginal edge of the slot being bent outwardly at an angle with respect to the first-mentioned marginal edge to guide auxiliary air passing through the slots into a swirling pattern of motion about and along the axis of the flame retention head, and an igniter on said cylindrical member and including electrodes extending to the vicinity of said nozzle; and means extending between said supply assembly and said burner assembly for coupling said igniter to said electrical control assembly, for transmitting primary air from said primary air pump to said primary air passage in said nozzle, for transmitting oil from said oil pump to said oil passage in said nozzle, and for transmitting auxiliary air from said blower to said auxiliary air inlet passage.

References Cited

UNITED STATES PATENTS

| | | | |
|---|---|---|---|
| 2,665,748 | 1/1954 | Cornelius | 431—352 |
| 3,017,753 | 1/1962 | Schirp et al. | 62—491 |

CARROLL B. DORITY, Jr., Primary Examiner

U.S. Cl. X.R.

431—351, 354